Figure 1:
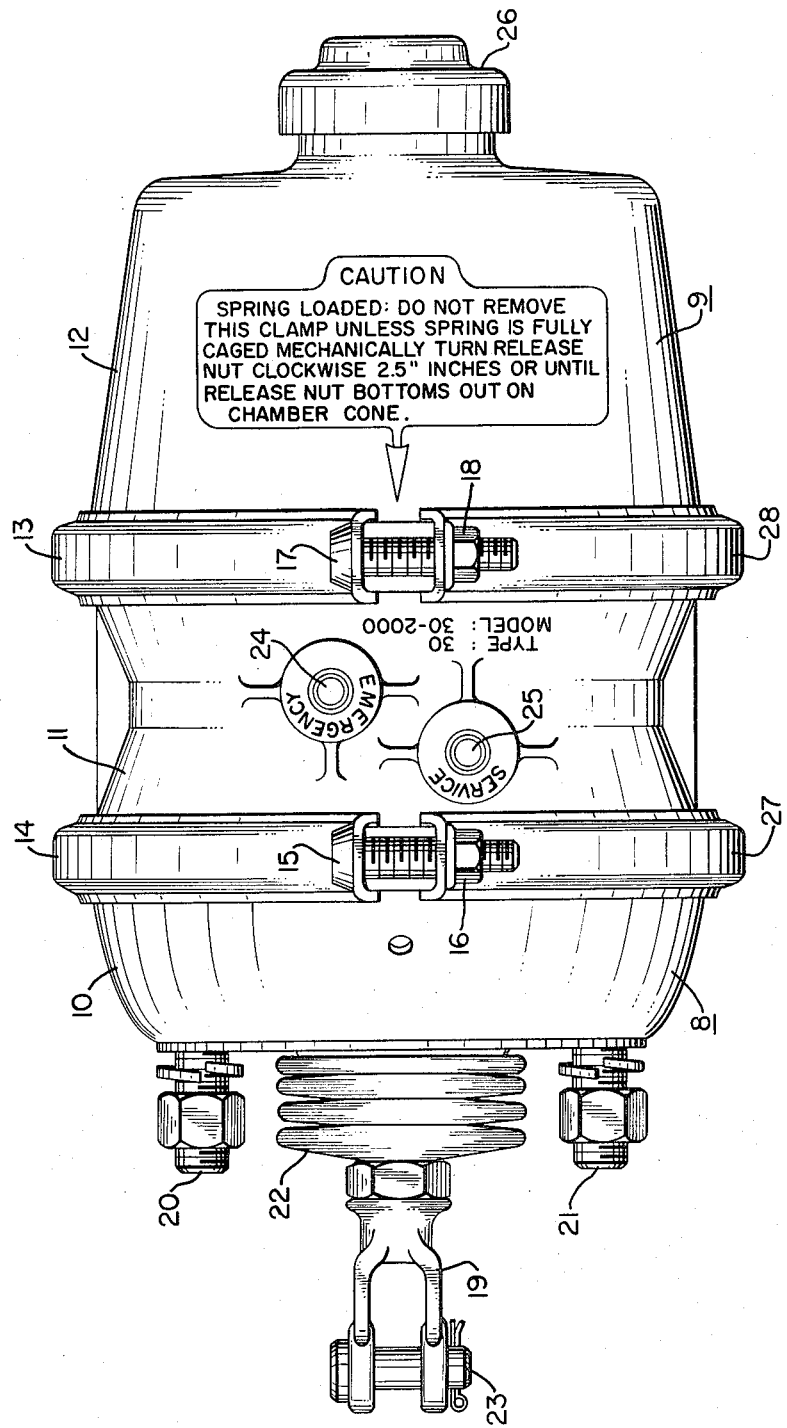

United States Patent [19]

Doyle et al.

[11] 3,796,138
[45] Mar. 12, 1974

[54] PNEUMATIC SERVICE EMERGENCY ACTUATORS FOR TRUCKS, BUSES AND TRAILERS

[75] Inventors: John F. Doyle, Long Beach; Gary E. Gardner, Los Alamitos; Raymond S. Elliot, South Gate, all of Calif.

[73] Assignee: TMR Products Co., Inc., South Gate, Calif.

[22] Filed: July 19, 1972

[21] Appl. No.: 273,349

[52] U.S. Cl............................ 92/63, 92/64, 188/170
[51] Int. Cl. ............................................. F01b 7/00
[58] Field of Search ............. 92/62, 63, 64; 188/170

[56] References Cited
UNITED STATES PATENTS

| | | | |
|---|---|---|---|
| 3,101,219 | 8/1963 | Herrera | 92/63 X |
| 3,112,959 | 12/1963 | Kateley | 92/63 X |
| 3,117,496 | 1/1964 | Dobrikin | 92/63 |
| 3,152,521 | 10/1964 | Cruse | 92/63 |
| 3,291,004 | 12/1966 | Stevenson et al. | 92/63 |
| 3,331,291 | 7/1967 | Rumsey | 92/64 X |
| 3,508,469 | 4/1970 | Williams | 92/63 |
| 3,515,438 | 6/1970 | Stevenson et al. | 92/64 X |

*Primary Examiner*—Edgar W. Geoghegan
*Assistant Examiner*—Abraham Hershkovitz
*Attorney, Agent, or Firm*—Lindenberg, Freilich & Wasserman

[57] ABSTRACT

This invention relates generally to pneumatic braking systems such as used on trucks, buses and trailers and more particularly to an improved fail-safe mechanical release mechanism, incorporated with the powerful emergency actuator booster which is used as a parking brake and particularly as an emergency brake to provide safe stops under certain contingencies and particularly upon failure of some part of the pneumatic system.

4 Claims, 3 Drawing Figures

PNEUMATIC SERVICE EMERGENCY ACTUATORS FOR TRUCKS, BUSES AND TRAILERS

Emergency actuators of the type to which this invention relates are in wide use in conjunction with the conventional brake booster having an actuating rod means for coupling the same to pivot cam operating brake arm so as to set the brake shoes.

Such emergency actuators commonly utilize mechanical spring means attached to the cover of the pneumatic booster and are normally held fully compressed by means utilizing air pressure employed to operate the vehicle brakes and other auxiliaries.

Much effort has been made by designers with the objective that adequate safeguards be provided so as to permit assembly and disassembly as well as servicing of the parking, emergency actuator mechanism without necessitating stringent regulations and faithful adherence thereto by those responsible for such operations. Despite the many improvements there remain many disadvantages and shortcomings. It has been found impossible in actual practice to avoid serious accidents for various reasons, particularly with the double diaphragm service, emergency spring actuators.

With the foregoing shortcomings and disadvantages of prior constructions in mind, it is an object of this invention to provide an improved energy actuator avoiding the foregoing and other disadvantages while providing a fail-safe power spring release mechanism.

A further object is to provide an improved emergency actuator which is readily constructed, reliable, durable and economically competitive, thus greatly reducing replacement and/or maintenance costs.

Another object is the elimination of many close fitting parts and the substantial elimination of close manufacturing tolerances, thus eliminating wear from metal-to-metal contact, which will greatly increase the service life of the emergency actuator.

A particularly important object of the invention resides in the simplicity, ruggedness and utilization of high-strength fully proven neoprene diaphragm which is employed in cooperation with air pressure to hold the powerful barrel-shaped spring in the fully released position, until a dangerous or malfunctioning condition within the normal braking system exists. Disposed between the said diaphragm and powerful barrel-shaped spring is a floating piston spring plate whose angular side walls maintain an axial alignment between diaphragm and powerful barrel-shaped spring; yet it allows for any undesirable lateral motion or wobbling of the assembly.

Figure 2:
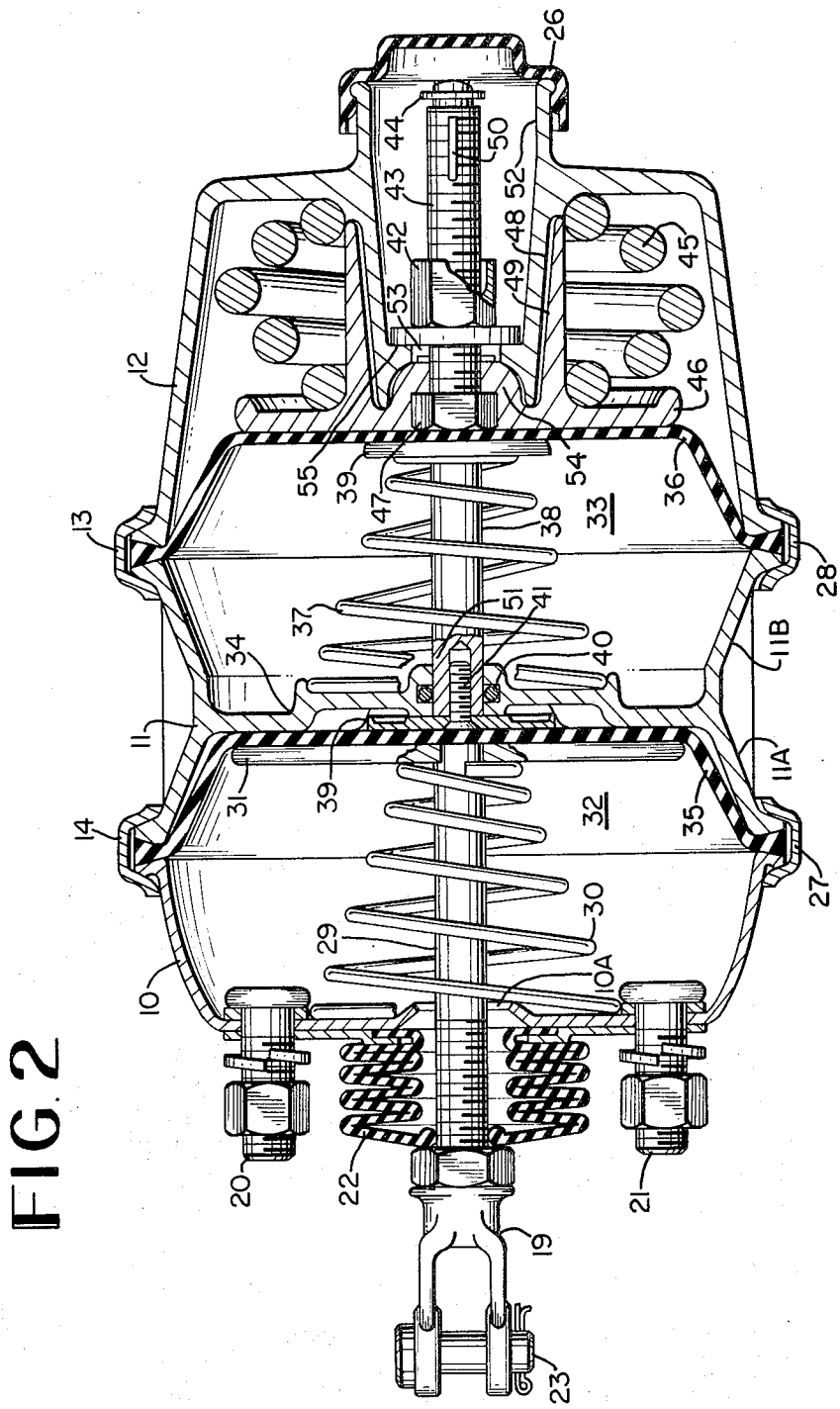
Figure 3:
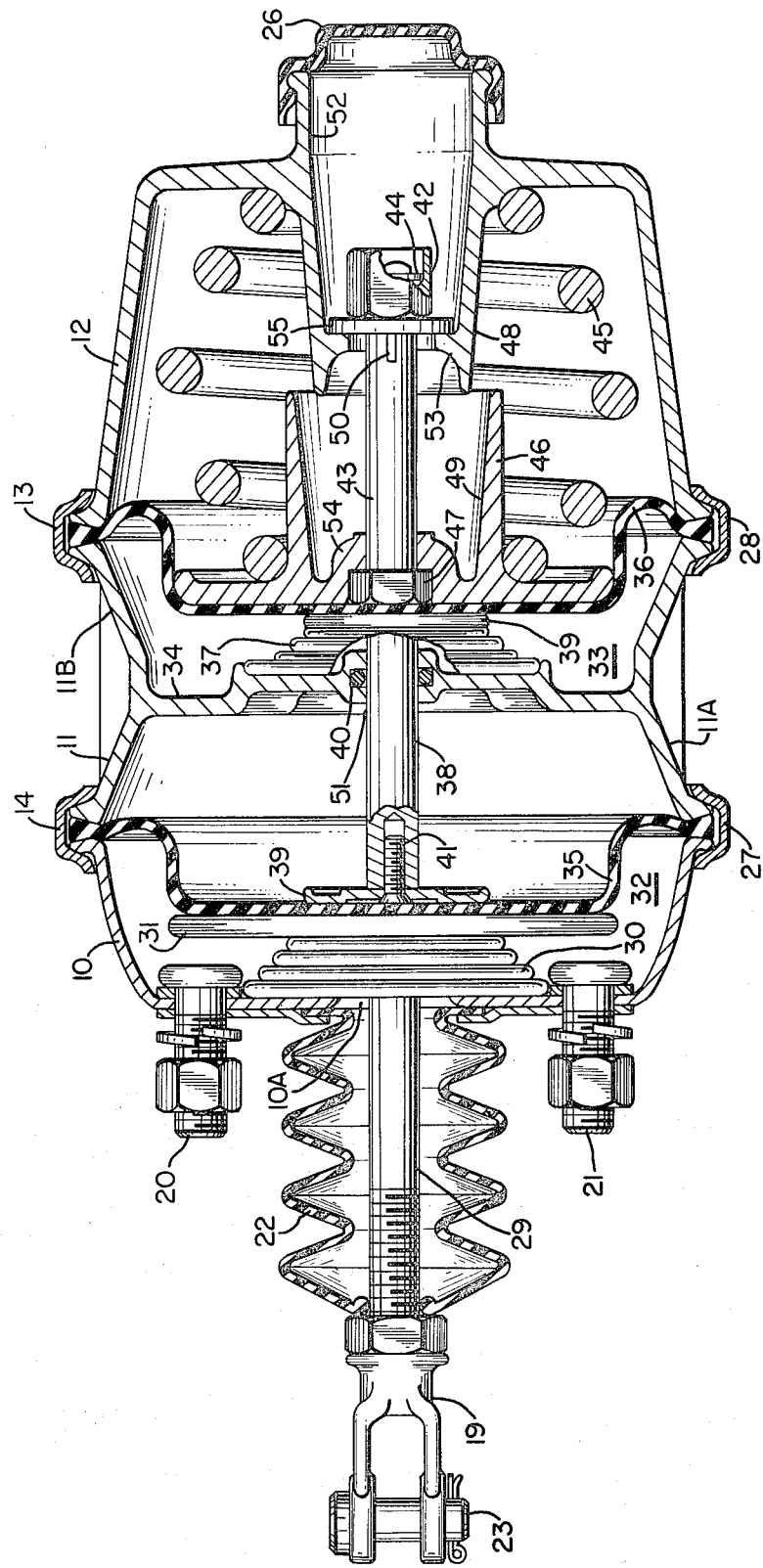

The invention will be more clearly understood by reference to the description below of certain embodiments of the invention taken in connection with the accompanying drawings, in which:

FIG. 1: is an overall perspective view of the improved pneumatic service, emergency actuator;

FIG. 2: is a longitudinal cross-section through the improved pneumatic service, emergency actuator, showing the device in its inoperative or hold-off position;

FIG. 3: is a longitudinal cross-section through the improved pneumatic service, emergency actuator, showing the device in its operative or applied position.

Referring first to FIG. 1, there is shown each of the brake actuator units is formed of two portions, namely the primary air brake chamber 8 which is a conventional brake booster, in combination with the fail-safe emergency actuator 9 which incorporates the features of the invention.

As will be recognized by those skilled in this art, certain components are of conventional constructions associated with braking the vehicle.

The service, emergency actuator is comprised of a metal dished casing 10, an intermediate two-boss air-inlet port adapter housing 11, and a rear cup-shaped casing 12. The three sections are held together by circumferential clamp bands 13, 14, 27 and 28. Also illustrated in FIG. 1 are suitable mounting bolts 20 and 21 fixedly secured to the bottom thereof of metal dished casing 10, thus rigidly securing the service, emergency actuator to bracket means (not shown) of the vehicle chassis. Suitable air-inlet ports such as indicated at 24 and 25 are provided to enable pneumatic operation of the mechanism within the casings.

Referring now to FIG. 2, the front section of the service, emergency actuator includes a first chamber 32, composed of a first heavy-duty neoprene diaphragm 35, the peripheral edges of which are clamped between the casing sections 10 and 11 by circumferential clamp bands 14 and 27. As shown in FIG. 1 the clamp bands are formed in two halves, each provided at their ends with integral lugs, projecting laterally therefrom and provided with holes seating clamping bolts 15 and clamping nuts 16. The service push rod means 29 in turn terminates in an annular piston plate 31 resiliently held against the inner face of diaphragm 35 by a conical compression spring 30. Means are provided in the form of dust boot 22 in the lower end from which the service push rod 29 extends to prevent excessive outside impurities from entering the front portion of chamber 32. The portion of the chamber to the rear of the diaphragm 35 in turn is arranged to receive pressurized air through air-inlet port 25 as shown in FIG. 1. With the arrangement described thus far, the conical compression spring 30 will normally hold the piston plate 31 and diaphragm 35 in the extreme right hand position so that the service push rod 29 is retracted and the brakes of the vehicle are released. When it is required to operate the service brake, pressurized air is received through air-inlet port 25 as shown in FIG. 1, to the rear of diaphragm 35, thus forcing the diaphragm forwardly or to the left to extend the service push rod means 29 through opening 10A in the lower wall of casing 10. The service push rod means 29 is threadably connected at its forward end to a clevis yoke 19 which is pivoted at clevis pin 23 on a conventional brake arm slack adjuster (not shown). Displacement of the service push rod 29 to the left will cause a displacement of clevis pin 23 and a consequent rocking motion of the brake arm slack adjuster in a manner that is well understood by those skilled in this art.

The second section of the service, emergency actuator is shown to the right of the first chamber 32. This latter emergency actuator includes a chamber 33 disposed to the rear of the chamber 32 and having a common wall portion 34 therewith defined by the intermediate adapter housing 11; this adapter housing includes a shallow dished forwardly facing cup 11A and a similarly shallow dished rearwardly facing cup 11B. The said common wall portion 34 of these members constitute a dividing partition formed axially thereof with an opening 51 with a fluid-tight O-ring seal 40, which renders chamber 33 of the emergency actuator section fluid-tight.

within the second chamber 33 there is a second heavy-duty neoprene diaphragm 36, the peripheral edges of which are clamped between the casing sections 11 and 12 by circumferential clamp bands 13 and 28; as shown in FIG. 1 the clamp bands are formed in two halves each provided at their ends with integral lugs, projecting laterally therefrom and provided with holes seating clamping bolts 17 and clamping nuts 18.

Supported in opening 51 is a rigid cylindrical push rod 38 provided at one end with a removable plate member 39, a second removable plate member 39 is secured to the other end of push rod 38 by means of screws 41. The cylindrical push rod 38 is spring biased to the right by a conical compression spring 37 having its inner end seated in an annular groove formed in partition 34 and its smaller diameter end bearing against the surface of plate 39.

The front portion of chamber 33 is adapted to receive pressurized air through air-inlet port 24 described in FIG. 1.

Thus, by admitting pressurized air into chamber 33 the second heavy-duty neoprene diaphragm 36 will be urged rearwardly to the right as shown in FIG. 2.

Housed with the rear cup casing or rear housing 12 is a powerful compression spring 45 designed to a barrel configuration having a cross-sectional diameter of 0.531 inches as is best shown in FIG. 3. When fully retracted to the position shown in FIG. 2 this spring has an axial height of 2.50 inches and a fully expanded normal operating height of 5.00 inches thus greatly increasing the fatigue life of compression spring 45, as well as eliminating coil contact, excessive lateral movement which are the two primary causes for compression spring failure.

Malfunctions of these sources are therefore completely avoided. Likewise, there are no close manufacturing tolerances to be observed and checked during manufacture.

Emergency actuator 9 includes a rugged light-weight rear cup-shaped housing 12, provided at its rim an outwardly projecting flange, which cooperates with the similarly flanged portion of adapter casing 11 to grip the second heavy-duty neoprene diaphragm 36. The end wall of casing 12 is provided with a conical guide member 52 which is tapered along its inner and outer surfaces. The guide member has a forwardly facing tapered recess at its forward end for closely receiving a tapered protuberance or boss 54 that projects from the rearward face of a spring-engaging member or spring piston plate 46. The guide member 52 also has an axial opening 53 through which a threaded member or bolt 43 projects. Circling the outer section of guide member 52 of housing 12 is the powerful compression spring 45, having its outer end bearing against the inside wall of casing 12 and the inner end bearing against spring piston plate 46.

Holes are provided in the angular side walls of casing 12 so as to maintain the chamber in which compression spring 45 is located, under atmospheric pressure.

To permit assembly and disassembly as well as servicing of the emergency actuator 9, it is important that adequate safeguards be provided in the form of a safety release mechanism to hold the barrel compression spring compressed.

To this end, each service, emergency actuator is equipped with a bult-in fail-safe release mechanism comprised of a special fully threaded self-locking bolt 43 which is inserted into spring piston plate 46 and held in axial position by the cast internal hexagon configuration 47 mating with external hexagonal surface of special self-locking bolt 43, which projects beyond bearing surface 55 by a distance fully adequate to permit full travel of push rod 38. Hence, it is seen that special self-locking bolt 43 is maintained in a non-rotatable position by virtue of the mating of the head 47 with the interior contour of spring piston plate 46, thus locking the self-locking bolt 43 against rotation.

Assembled to the opposite end of the special self-locking bolt is a special configurated washer-faced nut assembly 42. When this nut is torqued along bolt 43 by a socket wrench to a position adjacent surface 55 the washer-faced surface of nut 42 projects well beyond opening 52 thereby positively preventing movement of spring piston plate 46 to the left.

As best illustrated in FIG. 3, it will be seen that rotation of the washer-faced nut 42 will cause axial displacement of the special washer-faced nut 42 within the internal chamber portion of guide member 52 in one direction or the other, depending on the direction of rotation of the nut. A special locking ring 44 is arranged to be threadably received within the cone portion of nut 42. Working in conjunction with ring 44 is a special nylon type insert 50 located at the outer end of bolt 43 which functions to maintain the washer-faced nut in a fixed position eliminating any axial motion or vibration.

The washer-faced nut 42 can be removed when it is desired by removing the locking ring 44 from the grooved portion of bolt 43 and then rotating the washer-faced nut counter-clockwise until it is fully disengaged.

A further feature of spring piston plate 46 is the provision of a conical guide member 49 tapered in width along its inner surface and projecting within barrel spring 45 and cooperating with the outer surface 48 of the guide member 52 which is cast integral with the bottom of casing 12. Accordingly, if the spring piston plate 46 should become displaced from its central position when in expanded position, it is automatically re-centered during the next retraction movement of barrel spring 45. It will be understood that there is no opportunity for the described emergency actuator components, namely, spring piston plate 46 and barrel spring 45, to become cocked, twisted or bound thus causing the safety actuator to malfunction or render the unit inoperative. As shown in FIG. 2, this is because the tapered guide members 52, 49 closely nest in one another when the spring piston plate 46 is in its most rearward position when some of the coils of the barrel spring 45 nest in one another.

Likewise, there are no close manufacturing tolerances to be observed and checked during manufacture and assembly. Additionally, temperature changes cannot effect the operation nor can the components become fouled with dirt and foreign matter. The described fail-safe mechanical release assembly is shielded against road dirt and other outside contaminants by an easily assembled rubber dust cover 26 held seated about special self-locking bolt 43 and washer-faced nut 42 as by a cast lip formed at the outer end of the guide member 52 of casing 12.

With references now to both FIGS. 2 and 3, the operation of the service, emergency actuator setting structure will be set forth. As described heretofore, assuming that pressurized air is maintained in the front portion of chamber 33, the powerful barrel spring 45 and diaphragm 36 will remain in the positions illustrated in FIG. 2. Since the front portion of the rigid adapter push rod 38 engaging the rear of the first diaphragm 35 is not secured to the diaphragm 35, the diaphragm 35 and service push rod shaft 29 are free to move to extended or retracted positions independently of the rigid adapter push rod 38. Thus, the normal pneumatic operation of the brakes may be carried out.

When it is desired to set the brakes as for parking or in the event that the pressurized air system fails, the descreased pressure within the second chamber 33 resulting from exhausting the air therefrom or from a failure in the pressure line will enable the powerful barrel spring 45 to urge the second diaphragm 36 towards the left, thus moving the adapter push rod 38 through opening 51 to, in turn, push the first diaphragm 35 and service push rod shaft 29—this action is illustrated in FIG. 3. In order for the driver to release the brakes when they are set in this emergency condition, he need only apply pressurized air through the air-inlet port 24 (see FIG. 1) to bear against the front surface of diaphragm 36 and compress the powerful barrel spring 45. However, in the event of loss of pressurized air due to the mechanical failure in the compressor or a leak in the pneumatic lines, the mechanical fail-safe release mechanism described in conjunction with FIG. 2 may be used. Thus, the rubber dust cover 26 is removed and the washer-faced nut assembly 42 is then rotated in a clockwise direction. The diameter of the nut is larger than the access opening 53 so that continued threading of the nut onto the release bolt will draw the spring piston plate 46 to the right thereby compressing the powerful barrel spring 45. Compression of the barrel spring 45 enables the rigid adapter push rod 38 to be retracted by spring 37 and thus enables the retraction of the service push rod shaft 29.

When pressurized air has been restored to the pneumatic system, the diaphragm 36 will serve to hold the barrel spring 45 compressed so that the washer-faced nut 42 may be readily disengaged and rubber dust cover 26 re-assembled to casing 12.

It will be noted from the foregoing description that the mechanical compressing of the powerful barrel spring 45 can readily be effected by providing permanent compressing means on the rear portion of casing 12, as well as provide a true fail-safe mechanism that does not require strict adherence to manufacturing instructions for mechanical release or guess work on whether or not a portable release tool is properly installed.

In addition to the foregoing, it will be noted that removal of the circumferential clamp bands 13 and 28 will not endanger the individual performing the disassembly operation even if said individual fails to first compress the powerful barrel spring 45 as noted from the foregoing description, because the barrel spring 45 can only extend as far as the washer-faced nut 42 allows or until the washer-faced nut buttons out on surface 55. This is best illustrated in FIG. 3.

While we have described particular embodiments of our invention, it should be understood that various modifications and adaptations thereof may be made within the spirit of the invention as set forth in the appended claims.

We claim:
1. In a brake operating device in which a push rod is moved between applied and release positions by air pressure, but must be maintained in an applied condition when there is no air pressure and must also be manually releasable from the applied condition, the improvement comprising:
   a spring plate coupled to the push rod;
   a rear housing;
   a heavy duty barrel spring extending the spring plate and rear housing to urge the spring plate forwardly to move the push rod to an applied position;
   said spring plate being located within said rear housing and being unrestrained against lateral movement therein;
   a threaded member having a forward end engaged with the spring plate and a rearward end;
   nut means coupling the rearward end of the threaded member to the rear housing so that the threaded member can be advanced rearwardly to pull the spring plate rearwardly and compress the barrel spring until the coils thereof at least partially nest in one another; and
   first and second guide means disposed respectively on said spring plate and rear housing for centering the spring plate on the rear housing along most of the travel distance of the spring plate, including the travel portion thereof when the heavy duty spring becomes fully compressed, to assure that the barrel spring coils can properly nest in one another, said first and second guide means including tapered members, one lying within the other at all positions of the spring plate, said tapered members closely nesting in one another as the spring plate closely approaches its most rearward position at which the coils of the barrel spring being to nest in one another but said tapered members permitting wide lateral movement of the spring plate at its most forward position, and the forward end of the threaded member being free to laterally shift position with the spring plate when the plate is at its most forward position.

2. A brake operating assembly for a vehicle comprising:
   a slideably mounted push rod for applying and releasing a vehicle brake;
   a heavy duty spring (45) mounted to urge the push rod to an applied condition to apply the brake;
   an emergency actuator (36) pressurizable to move the push rod against the force of said spring to a release position, to release the brake when the vehicle has built up sufficient pneumatic pressure to permit later stopping;
   a service actuator (35) pressurizable to move the push rod to an applied condition to apply the brake to thereby stop the vehicle in normal operation;
   a lighter duty spring (30) urging the shaft toward a release position to release the brake, so that if the heavy duty spring is disabled at a time when there is no pneumatic pressure the brake can release; and means for manually disabling the heavy duty spring to release the brake, including a threaded member (43) extending along the axis of the spring, a spring-engaging member (46) coupling the forward end of the threaded member to the forward end of the heavy duty spring, rear housing means (12) for abutting the rear end of the heavy duty spring, and a nut (42) threaded on the shaft and abutting the rear housing means so that when the nut is tightened it compresses the heavy duty spring to disable it, said disabling means forming guiding means for guiding the abutting member in axial movement towards and away from the rear housing means;

said guiding means including a pair of tapered guide members, one of them (49) on the spring-engaging member and the other (52) on the rear housing means, one of said guide members surrounding the other throughout the range of movement of the spring-engaging member, said guide members being tapered in width so that they closely nest in one another when the abutting member moves to its furthest rearward position, but said tapered members forming a large lateral clearance between one another when the abutting member moves to its furthest forward position.

3. The brake operating apparatus described in claim 8 wherein:

the first tapered guide member surrounds the second tapered guide member;

said spring-engaging member has a rearwardly facing tapered protuberance; and said second tapered guide member has walls at its forward end that form a tapered recess for receiving said protuberance when the abutting member is moved to its most rearward position.

4. A brake operating assembly comprising in combination, a first chamber (32), a first diaphragm (35) mounted in said chamber adjacent one end thereof, a reciprocable brake actuating shaft (29) mounted axially in said chamber and extending exteriorly of the other end of said first chamber, a disc (31) connected to one end of said shaft and engaging one side of said first diaphragm, a conical spring (30) nested against said disc and urging said first diaphragm and said shaft toward said one end of said first chamber, a pressure fluid inlet port (25) to said first chamber on the side of said first diaphragm nearest said one end, a second chamber (33) located inside an emergency actuator casing (12) and mounted adjacent said one end of said first chamber, an aperture (51) at said one end of said first chamber and the adjacent end of said second chamber and providing a fluid-tight passage between said first and second chambers, a second diaphragm (36) mounted in said second chamber and spaced from said passage, a rigid cylindrical push rod (38) mounted for reciprocating movement longitudinally along the axis of said shaft, said cylindrical push rod having a fluid-tight sliding fit through said aperture with its opposite ends normally bearing against the adjacent face of a respective one of said diaphragms, said emergency actuator casing having an outwardly flaring side wall, a powerful barrel configurated spring (45) including a spring piston plate (46) bearing at one end thereof and enclosed by said emergency actuator casing with said spring piston plate held against the central area of said second diaphragm solely by an internal conically shaped first guide member (49) extending toward an inner wall of said emergency actuator casing, the other end of said powerful barrel spring being nested to positioning means therefor carried by the outer wall of the internal conically shaped second guide member (48) of said emergency actuator casing, said spring piston plate (46) and the adjacent end of said powerful barrel spring being freely supported within said emergency actuator casing free of sliding engagement with any other surface of said brake operating assembly during expansion and retraction of said powerful barrel spring thereby allowing substantial lateral movement of the spring piston plate without any risk of said spring piston plate cocking or binding whereby operation of the emergency actuator is assured, means (24) for normally supplying pressurized air to the surface of said second diaphragm opposite the side contacting said piston plate and effective to hold said powerful barrel configurated spring means compressed against the emergency actuator casing inner wall in contact therewith whereby said powerful barrel configurated spring means is effective to drive said brake shaft if and when the pressure is relaxed on said last mentioned surface of said second diaphragm; said spring piston plate further has a center portion engaged with a bolt (43) to prevent rotation of the bolt, a manually operable member comprising a washer-faced nut threadably mounted on the outer end of said bolt and a locking device arranged to limit the extent of axial motion of said washer-faced nut along the threaded shank of said bolt.

* * * * *